United States Patent [19]

Horikawa et al.

[11] Patent Number: 4,565,849
[45] Date of Patent: Jan. 21, 1986

[54] POLYAMIDE ELASTOMER FROM CARBOXY TERMINATED POLYAMIDE AND POLYOXY-2-METHYL-1,3-PROPYLENE DIOL

[75] Inventors: Takeshi Horikawa; Kenichi Sasaki, both of Himeji, Japan

[73] Assignee: Daicel Chemical Industries, Ltd., Sakai, Japan

[21] Appl. No.: 630,509

[22] Filed: Jul. 11, 1984

[30] Foreign Application Priority Data

Jul. 25, 1983 [JP] Japan ................. 58-135384

[51] Int. Cl.$^4$ .................. C08L 67/00; C08L 77/00
[52] U.S. Cl. ..................... 525/420; 524/538; 524/539; 528/288
[58] Field of Search ............... 525/420; 528/288; 524/538, 539

[56] References Cited

U.S. PATENT DOCUMENTS

| 4,208,493 | 6/1980 | Deleens et al. | 525/420 |
| 4,361,680 | 11/1982 | Borg et al. | 525/420 |
| 4,376,856 | 3/1983 | Tanaka et al. | 525/420 |

Primary Examiner—Harold D. Anderson
Attorney, Agent, or Firm—Flynn, Thiel, Boutell & Tanis

[57] ABSTRACT

A process for preparing polyamide elastomers is provided which process comprises reacting a polyamide-forming component having carboxyl groups at both ends thereof with polyoxyalkylene glycol(s) at least 10 wt. % of which comprises a polyoxy-2-methyl-1,3-propylenediol having a number-average molecular weight of about 400 to 10,000. The polyamide-forming component forms a polyamide block having a recurring unit of the formula:

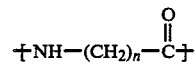

in which n represents a positive integer of 5 to 11, and/or

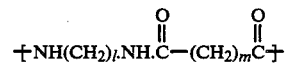

in which l represents a positive integer of 6 to 20 and m represents a positive integer of 4 to 20.

The obtained polyamide elastomers have excellent low-temperature properties and elastic recovery.

12 Claims, No Drawings

POLYAMIDE ELASTOMER FROM CARBOXY TERMINATED POLYAMIDE AND POLYOXY-2-METHYL-1,3-PROPYLENE DIOL

BACKGROUND OF THE INVENTION

1. Field of the Invention

The present invention relates to a process for preparing polyamide elastomers having rubbery elastic properties and excellent low-temperature resistance and recovery.

2. Description of the Prior Art

Recently, a thermoplastic elastomer having a so-called micro-phase separation structure, i.e. having a soft segment which exhibits a soft, rubbery elasticity and a hard segment which exhibits a hard, aggregated domain by forming physical crosslinkings according to a mutual action, such as crystallization or hydrogen bonding, in the molecular chain, has attracted attention, since the following facts have been found: the thermoplastic elastomer can be molded by a process generally employed for molding thermoplastic resins; substances widely ranging from a rubbery substance to a plastic substance can be obtained easily by suitably selecting the soft segment-forming and the hard segment-forming components; and the micro-phase separation structure of this material has special properties such as antithrombatic activities, membrane separation functions and adhesiveness.

The soft segment-forming components of the thermoplastic elastomers preferred from the viewpoint of low-temperature properties are polyoxyalkylenediols such as polyoxyethylene glycol, polyoxy-1,2-propylene glycol, polytetramethylene glycol, block or random copolymers of ethylene oxide and propylene oxide, and block or random copolymer of ethylene oxide and tetrahydrofuran. Among them, polyoxytetramethylene glycol is recommended from the viewpoint of its thermal resistance, water resistance, low-temperature properties, elastic recovery and mechanical strength. This compound is now in use as the soft segment-forming component for polyurethane, polyester elastomers and polyamide elastomers. For example, polyamide elastomers prepared by using polyoxytetramethylene glycol as the soft segment-forming component have been disclosed in the specifications of Japanese Patent Laid-Open Nos. 159586/1975, 12297/1977, 119997/1978, 126057/1978, 1298/1978 and 119925/1982.

However, when the polyoxytetramethylene glycol having a molecular weight exceeding a certain value is used, crystallization is caused in the soft segment due to its linear structure and, therefore, the properties thereof such as low-temperature properties and elastic recovery are not always satisfactory.

SUMMARY OF THE INVENTION

After intensive investigations made for the purpose of solving these problems, the inventors have found that a solution can be attained by using polyoxy-2-methyl-1,3-propylenediol as at least a part of the polyoxyalkylene glycol to be used as the soft segment-forming component. The present invention has been completed on the basis of this finding.

The present invention provides a process for preparing polyamide elastomers by reacting a polyamide-forming component having carboxyl groups at both ends thereof which forms a polyamide block having a recurring unit represented by the formula:

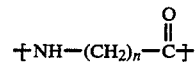

in which n represents a positive integer of 5 to 11, and/or

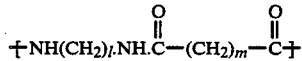

in which l represents a positive integer of 6 to 20 and m represents a positive integer of 4 to 20,
with a polyoxyalkylene glycol, characterized in that at least 10 wt. % of the polyoxyalkylene glycol comprises a polyoxy-2-methyl-1,3-propylenediol having a number-average molecular weight of about 400 to 10,000.

DETAILED DESCRIPTION OF THE PREFERRED EMBODIMENTS

The polyamide blocks herein are those containing a 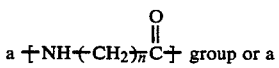 group or a

 group as a recurring unit, or those in which groups

are bonded with each other to form a block or random copolymer. The polyamide elastomer is formed by reacting the polyamide-forming component having carboxyl groups at both ends with the polyoxyalkylene glycol at the same time or successively to form a polyamide block. More particularly, a process for preparing the polyamide elastomer comprises subjecting a polyamide-forming monomer such as a lactam, α,ω-aminocarboxylic acid and/or a salt or an equivalent amount mixture of a diamine and a dicarboxylic acid to a ring-opening reaction or polycondensation reaction with a dicarboxylic acid in an amount required to form a polyamide prepolymer having carboxyl groups at both ends thereof, then subjecting the prepolymer to a condensation reaction with a polyoxyalkylene glycol to form an ester bond and also to introduce the polyamide block into the polyamide elastomer. Another process comprises subjecting a lactam, α,ω-aminocarboxylic acid and/or a salt or an equivalent amount mixture of a diamine and a dicarboxylic acid to a ring-opening reaction or polycondensation reaction with a small amount of a dicarboxylic acid in the presence of a polyoxyalkylene glycol to form the amide bond and ester bond simultaneously, whereby forming the polyamide elastomer.

In the recurring unit of the formula:

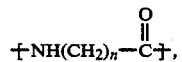

n is a positive integer of 5 to 11. Monomers constituting this recurring unit and available on the market include ε-caprolactam, α,ω-aminoundecanoic acid, lauryllactam and α,ω-aminododecanoic acid. In the recurring unit of the formula:

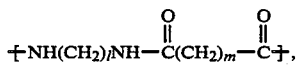

l is a positive integer of 6 to 20 and m is a positive integer of 4 to 20. They are obtained from corresponding diamines and dicarboxylic acids. Particularly easily available diamines are hexamethylenediamine, decamethylenediamine and dodecamethylenediamine. Particularly easily available dicarboxylic acids are adipic acid, azelaic acid, sebacic acid, dodecanedioic acid, dodecane-dicarboxylic acid, tetradecanedicarboxylic acid and octadecanedicarboxylic acid. The melting point of the polyamide block is preferably at least 200° C., since the condensation reaction with the polyoxyalkylene glycol to form the ester bond is carried out in a molten state. Preferred copolyamide block which varies depending on the length of the polyamide block includes, for example, nylon 12 block, nylon 11 block, nylon 12/nylon 6/nylon 66 copolyamide block, nylon 12/nylon 6/nylon 6·12 copolyamide block and nylon 12/nylon 6·10 copolyamide block.

A dicarboxylic acid is used for controlling the length of the polyamide block, introducing carboxyl groups into both ends of the block and forming the ester bond by the simultaneous or successive reaction with the polyoxyalkylene glycol. The dicarboxylic acids may be aliphatic, aromatic or alicyclic dicarboxylic acids such as adipic, azelaic, sebacic, dodecanedioic, or terephthalic acid. The term "simultaneous reaction" herein refers to a reaction of (1) the polyamide-forming monomer (a polyamide block-forming component), (2) the polyoxyalkylene glycol and (3) a dicarboxylic acid for bonding components (1) and (2) together to form the amide bond and the ester bond simultaneously, thereby obtaining the polyamide elastomer. The term "successive reaction" herein means a reaction for forming the polyamide prepolymer having carboxyl groups at both ends thereof which forms the polyamide block from the polyamide-forming monomer and the dicarboxylic acid and then forming the polyamide elastomer by the condensation reaction thereof with the polyoxyalkylene glycol.

The amount of the dicarboxylic acid to be used as the connecting component is controlled so that the average molecular weight of the polyamide block determined by a method known in the field of the polycondensation reaction would be in the range of about 400 to 10,000, preferably about 800 to 6,000.

When an α,ω-aminocarboxylic acid is used in the amidation reaction for forming the polyamide block, no catalyst is required. When the lactam is used, a catalyst such as water or phosphoric acid is required. In the esterification reaction, a known polyester-forming catalyst such as zinc acetate or a tetraalkoxy titanate is used. The esterification reaction is carried out at 220° to 270° C. under a reduced pressure of lower than 1 mmHg, preferably lower than 0.5 mmHg.

Among the polyoxyalkylene glycols being used as the soft segment-forming components according to the present invention, polyoxy-2-methyl-1,3-propylenediol is prepared by a cationic ring-opening polymerization of 3-methyloxetane. Namely, a combination of perchloric acid/acetic anhydride or perchloric acid/very strong acid such as fuming sulfuric acid or fluorosulfonic acid is added to 3-methyloxetane to effect the ring-opening polymerization reaction. The resulting reaction product is saponified to obtain a polyoxy-2-methyl-1,3-propylenediol. The molecular weight of the polyoxy-2-methyl-1,3-propylenediol may be in the range of about 400 to 10,000. The molecular weight can be controlled by suitably selecting the cationic ring-opening polymerization conditions such as initiator, concentration and method of the addition of the monomer and catalyst. Generally, a polymer of a low molecular weight is obtained when a combination of perchloric acid/acetic anhydride or perchloric acid/fuming sulfuric acid is used and a polymer of a high molecular weight is obtained when fluorosulfonic acid is used. Further, the polyoxy-2-methyl-1,3-propylenediol having a high molecular weight is obtained when the concentration of the initiator used is low. When the molecular weight of the polymer is below about 400, the characteristic properties of the soft domain cannot be realized. On the other hand, when the molecular weight thereof exceeds about 10,000, it becomes difficult to obtain a polyamide elastomer having a high molecular weight because a problem of compatibility with other components used for forming the polyamide elastomer structure occurs, though the phase separation structure becomes clearer and the characteristic properties of the soft domain are realized. Therefore, to facilitate the preparation, the polyoxy-2-methyl-1,3-propylenediol having a molecular weight of about 400 to 10,000, particularly about 500 to 5,000 is preferred.

The polyoxy-2-methyl-1,3-propylenediol may be used either alone or in the form of a mixture with another polyoxyalkylene glycol. In the latter case, the amount of the polyoxy-2-methyl-1,3-propylenediol should be at least 10 wt. % based on the mixture. It is considered that the methyl side chain of the soft segment derived from the polyoxy-2-methyl-1,3-propylenediol inhibits the crystallization of a soft segment comprising the other polyoxyalkylene glycol and, therefore, the low temperature properties and elastic recovery intended in the present invention are obtained. However, when the amount of the polyoxy-2-methyl-1,3-propylenediol is less than 10 wt. %, the characteristic features of the invention cannot be obtained.

The polyoxyalkylene glycols usable in combination with the polyoxy-2-methyl-1,3-propylenediol are not particularly limited. Various polyoxyalkylene glycols are available on the market. However, polyoxyethylene glycol and ethylene oxide/propylene oxide block polymer are not preferred due to their high hygroscopicities; polyoxy-1,2-propylene glycol is also not preferred because of its reactivity due to the secondary alcoholic group; and ethylene oxide/tetrahydrofuran block copolymer is not preferred in view of its poor thermal stability. The most preferred polyoxyalkylene glycol to be used together with the polyoxy-2-methyl-1,3-propylenediol is polyoxytetramethylene glycol.

An antioxidant is added to the reaction system at a suitable time in the course or after completion of the preparation of the polyamide elastomer for the purpose of preventing a thermal deterioration during the polycondensation reaction or the molding step. The antioxidants include aliphatic and aromatic esters and alkyl-substituted aromatic esters of phosphoric or phosphorous acid as well as phenol derivatives, particularly hindered phenols having a group of a high steric hindrance. Further, the composition may contain other additives used for improving the properties of the final product, such as a filler or reinforcing agent, e.g., kaolin, silica, mica, talc, titanium dioxide, alumina, glass fibers or carbon fibers; lubricant or releasing agent, e.g. zinc stearate or stearic acid bisamide; U.V. absorber; dye or pigment used for coloring; flame retardant, e.g. antimony trioxide, octabromodiphenyl or tetrabromobisphenol polycarbonate; and plasticizer.

The following examples will further illustrate the present invention.

In the examples, the hydroxyl value was determined by phthalic anhydride/pyridine method and the acid value was determined by direct neutralization titration method using a pyridine solution.

The relative solution viscosity was determined at 25° C. by using a 0.5% m-cresol solution. The melting point and glass transition temperature were determined with a differential scanning calorimeter (hereinafter referred to as DSC) at a temperature rise rate of 20° C./min.

The tensile strength and elongation were determined by punching dumbbell test pieces according to JIS from a pressed sheet having about 1 mm thickness, leaving the test pieces to stand at 23° C. in a relative humidity of 65% for 10 days or longer and measuring the strength by means of a Tensilon universal tensile tester at a crosshead speed of 50 mm/min. The tensile strength at break, tensile elongation at break, yield strength in tension, 100% modulus and 300% modulus were determined from a stress-strain curve obtained. The instantaneous elastic recovery and delayed elastic recovery were determined by providing bench marks at intervals of a on the dambbell test pieces, stretching the test pieces to 200%, keeping the stretched state for 5 min, removing the stress to make them free, immediately thereafter measuring a distance b between the marks, measuring a distance c between the marks again 10 min after the removal of the stress and determining the recoveries according to the following formulae:

$$\text{Instantaneous elastic recovery} = \frac{2a - b}{a} \times 100\%$$

$$\text{Delayed elastic recovery} = \frac{2a - c}{a} \times 100\%$$

The bending recovery at low temperature was determined by using test pieces of 20 mm width, 120 mm length and 1 mm thickness. The test pieces were bent at an angle of 180° around a glass rod having 30 mm diameter by means of clips at −30° C. for 30 min. Then the clips were removed at that temperature. The angles of the test pieces were measured immediately after the removal of the clips and 10 min thereafter. The results were represented by percentage based on 180° angle.

EXAMPLE 1

The polyoxy-2-methyl-1,3-propylenediol being used in the present invention was prepared as follows: 1.2 ml of acetic anhydride was added to 100 ml of anhydrous 3-methyloxetane obtained by dehydration over potassium hydroxide followed by reflux in the presence of metallic sodium for 1 h and distillation. The mixture was cooled to −70° C. in dry nitrogen atmosphere. 1.2 ml of 70% perchloric acid was added dropwise to the mixture under stirring over about 20 min. After completion of the addition, the mixture was kept at −70° C. for 1 h and then the temperature of the reaction system was elevated slowly to room temperature in about 1 h. In this step, the system was sealed in the dry nitrogen atmosphere and then left at room temperature for 50 h to effect polymerization, thereby obtaining a colorless, transparent, viscous liquid. About 100 ml of pure water was added to the liquid to terminate the reaction. The reaction mixture was heated to 90° C. to remove unreacted 3-methyloxetane monomer. 200 ml of a ½N solution of potassium hydroxide in ethanol was added to an organic layer and the mixture was stirred under heating to 90° C. for about 2 h to effect the saponification. Thus, a diol compound having hydroxyl groups at both ends was obtained. After completion of the saponification, ethanol was completely distilled off. The residue was then dissolved in ethanol and a solid matter was filtered out. If necessary, active carbon and active clay were added thereto and the mixture was left to stand. Ether was distilled off from the filtrate to obtain 73.6 g (yield: 87.5%) of polyoxy-2-methyl-1,3-propylenediol in the form of a colorless, transparent, viscous liquid. The product had an acid value of 1.3 mgKOH/g, hydroxyl value of 79.8 mgKOH/g, number-average molecular weight determined from the hydroxyl value of 1406 and the number of the recurring units (2-methyl-1,3-propylene ether), i.e. the degree of polymerization, of about 19. The number-average molecular weight of the product determined by means of a vaper pressure osmometer (a product of Knauer Co.) was 1390 which was close to that determined by the terminal group determination method.

Then, 67.6 g of the thus obtained polyoxy-2-methyl-1,3-propylenediol, 45.0 g of α,ω-aminododecanoic acid and 11.1 g of dodecanedioic acid were charged in a 200 ml stainless steel reaction vessel provided with a helical stirrer. 0.2 g of Irganox 1098 (a product of Ciba-Geigy Co.) used as an antioxidant and 0.05 g of tetrabutoxy titanate used as an esterification reaction catalyst were added to the mixture. The gas in the reaction vessel was completely replaced with nitrogen and then the temperature was elevated. The stirring was begun when the temperature in the vessel was elevated to 220° C. The stirring was effected in dry nitrogen atmosphere. After carrying out the reaction at 220° C. for 1 h, the pressure of the system was reduced and the temperature was elevated to attain 0.3 mm Hg and 250° C., respectively, after about 30 min. The reaction was continued under these conditions for 7 h. After completion of the reaction, 0.3 g of Irganox 1098 was further added to the reaction mixture under reduced pressure and mixed in a molten state. The product was taken out through an outlet at the bottom of the vessel in the form of strands and then shaped into pellets. A pressed sheet having 1 mm thickness was prepared from the pellets by molding and the properties thereof were examined to obtain the following results:

| | |
|---|---|
| relative solution viscosity: | 1.81 |
| tensile strength at break: | 180 Kgf/cm$^2$ |
| tensile elongation at break: | 810.0% |
| 100% modulus: | 104 Kgf/cm$^2$ |
| 300% modulus: | 150.0 Kgf/cm$^2$ |
| instantaneous elastic recovery: | 65% |
| delayed elastic recovery: | 85% |
| DSC { melting point: | 149° C. |
| DSC { glass transition temp. | −68° C. | bending recovery at low temp. (−30° C.): 65.5% immediately after removal of the load and 85.0% after 10 min.

COMPARATIVE EXAMPLE 1

Polyoxytetramethylene glycol having a number-average molecular weight of 1400 was used in place of the polyoxy-2-methyl-1,3-propylenediol that was used in Example 1. The same experiments as in Example 1 were repeated using this product. The results were as shown below:

| relative solution viscosity: | 1.80 |
|---|---|
| tensile strength at break: | 130 Kgf/cm$^2$ |
| tensile elongation at break: | 695.0% |
| 100% modulus: | 85 Kgf/cm$^2$ |
| 300% modulus: | 115 Kgf/cm$^2$ |
| instantaneous elastic recovery: | 45% |
| delayed elastic recovery: | 65% |
| DSC { melting point: | 150° C. |
| glass transition temp.: | −65° C. | bending recovery at low temp. (−30° C.): 44.5% immediately after removal of the load and 67.8% after 10 min.

EXAMPLE 2

780 g of lauryllactam, 230 g of dodecandioic acid, 14 g of α,ω-aminododecanoic acid and 26 g of water were charged in a 3-l stainless steel autoclave and the gas in the autoclave was replaced completely with nitrogen. Then, the temperature was elevated and the internal pressure was reduced under stirring to maintain the mixture at 290° C. under 19 kg/cm$^2$G for 7 h. Thereafter, the temperature was lowered to 250° C. and the pressure was returned to atmospheric pressure. The reaction was continued at 250° C. for 5 h while nitrogen was introduced therein. The resulting polyamide prepolymer was in the form of white, opaque, brittle solid having a number-average molecular weight determined from the carboxyl value of 991.

A polyoxy-2-methyl-1,3-propylenediol having a number-average molecular weight of 1003 was synthesized in the same manner as in Example 1.

Then, 50 g of the polyamide prepolymer having terminal carboxyl groups, 50.6 g of polyoxy-2-methyl-1,3-propylenediol having a number-average molecular weight of 1003, 0.08 g of tridecyl phosphite used as a stabilizer and 0.49 g of tetrabutoxy titanate used as a catalyst were charged in a 100-ml stainless steel reaction vessel provided with a helical stirrer. The gas in the reaction vessel was completely replaced with nitrogen and then the temperature was elevated. The stirring was begun when the temperature in the vessel was elevated to 220° C. and at the same time, the pressure was reduced slowly. After about 1 h, a temperature of 260° C. and pressure of 0.3 mm Hg were realized. The reaction was continued under these conditions for 7 h. The pressure was returned to atmospheric pressure. A pressed sheet having 1 mm thickness was prepared and the properties thereof were examined in the same manner as in Example 1.

| relative solution viscosity: | 1.79 |
|---|---|
| tensile strength at break: | 192 Kgf/cm$^2$ |
| tensile elongation at break: | 835% |
| 100% modulus: | 114 Kgf/cm$^2$ |

-continued

| 300% modulus: | 162 Kgf/cm$^2$ |
|---|---|
| instantaneous elastic recovery: | 67% |
| delayed elastic recovery: | 86% |
| DSC { melting point: | 150° C. |
| glass transition temp.: | −67.5° C. | bending recovery at low temp. (−30° C.): 67.0% immediately after removal of the load and 87.0% after 10 min.

EXAMPLE 3

972 g of lauryllactam, 60 g of dodecanedioic acid, 333 g of polyoxy-2-methyl-1,3-propylenediol having a number-average molecular weight of 2530, 131 g of polyoxytetramethylene glycol having a number-average molecular weight of 1000, 10 g of α,ω-aminododecanoic acid, 0.75 g of tetrabutoxy titanate and 2.5 g of Irganox 1098 were charged in a 3-l stainless steel autoclave. The gas in the autoclave was replaced completely with nitrogen. Then, the temperature was elevated and the reaction was continued under stirring at 270° C. under 19 kg/cm$^2$G for 7 h. The conditions of the reaction system were controlled to 250° C. and 1 atm and then, the pressure was reduced to continue the reaction for additional 5 h under stirring at 250° C. under 0.3 mmHg. The reaction product was taken out in the form of strands and then shaped into pellets by means of a pelletizer. A pressed sheet having 1 mm thickness was prepared from the pellets and the physical properties thereof were examined.

The results were as follows:

| relative solution viscosity: | 1.90 |
|---|---|
| tensile strength at break: | 239 Kgf/cm$^2$ |
| tensile elongation at break: | 530.0% |
| 100% modulus: | 171 Kgf/cm$^2$ |
| 300% modulus: | 202.0 Kgf/cm$^2$ |
| instantaneous elastic recovery: | 60% |
| delayed elastic recovery: | 75% |
| DSC { melting point: | 171° C. |
| glass transition temp.: | −58° C. | bending recovery at low temp. (−30° C.): 55% immediately after removal of the load and 70% after 10 min.

The embodiments of the invention in which an exclusive property or privilege is claimed are defined as follows:

1. A process for preparing a polyamide elastomer, which comprises: reacting (I) polyamide-forming component having carboxyl groups at both ends of the molecule and capable of forming polyamide blocks, with (II) polyoxyalkylene glycol component whereby to form the polyamide elastomer, the recurring units of said polyamide block being selected from the group consisting of units of the formula A

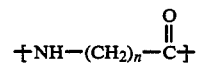

wherein n is an integer of 5 to 11, units of the formula B

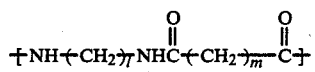

wherein l is an integer of 6 to 20 and m is an integer of 4 to 20,
and units of both of formula A and formula B, said polyamide blocks having a number average molecular weight of from 400 to 10,000, said polyoxyalkylene glycol component containing at least 10 wt.% of polyoxy-2-methyl-1,3-propylene glycol having a number average molecular weight of 400 to 10,000.

2. A process for preparing a polyamide elastomer which comprises the steps of:
reacting polyamide-forming components to form a polyamide having carboxyl groups at both ends of the molecule, said polyamide having a number average molecular weight of 400 to 10,000; and
reacting said polyamide, at a temperature of 220°–270° C., under a pressure of less than 1 mm Hg and in the presence of a polyester-forming catalyst and an antioxidant to prevent thermal deterioration of the polyamide when heated, with a polyoxyalkylene glycol component, at least 10 wt.% of which comprises poly-2-methyl-1,3 propylenediol having a number average molecular weight of 400 to 10,000.

3. A process as set forth in claim 2 wherein said polyamide has recurring units of the formula:

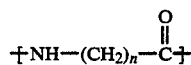

in which n is an integer of 5 to 11.

4. A process as set forth in claim 2 wherein said polyamide has recurring units of the formula:

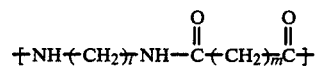

in which l is an integer of 6 to 20 and m is an integer of 4 to 20.

5. A process as set forth in claim 2 wherein said polyamide is comprised of recurring units of the formulas:

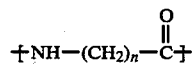

in which n is an integer of 5 to 11, and

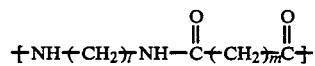

in which l is an integer of 6 to 20 and m is an integer of 4 to 20.

6. A process as claimed in claim 1 in which said polyoxyalkylene glycol component consists essentially of said polyoxy-2-methyl-1,3-propylene glycol.

7. A process as claimed in claim 1 in which said polyoxyalkylene glycol component consists essentially of a mixture of said polyoxy-2-methyl-1,3-propylene glycol and polyoxytetramethylene glycol.

8. A polyamide elastomer which has been obtained by a process as defined in claim 1.

9. A polyamide elastomer which has been obtained by a process as defined in claim 2.

10. A polyamide elastomer which has been obtained by a process as defined in claim 3.

11. A polyamide elastomer which has been obtained by a process as defined in claim 4.

12. A polyamide elastomer which has been obtained by a process as defined in claim 5.

* * * * *